United States Patent

Grenot et al.

[11] Patent Number: 5,910,942
[45] Date of Patent: Jun. 8, 1999

[54] DEVICE TO REGULATE THE FLOW OF ATM CELLS WITHIN AN ATM PACKET SWITCH

[75] Inventors: Thierry Grenot, Clamart; Colette Vivant, St Germain en Laye; Patrick Letourneur, Montigny le Bretonneux, all of France

[73] Assignee: Thomson-CSF, Paris, France

[21] Appl. No.: 08/728,500

[22] Filed: Oct. 9, 1996

[30] Foreign Application Priority Data

Oct. 24, 1995 [FR] France ................................ 95 12492

[51] Int. Cl.⁶ ........................................................ H04J 3/08
[52] U.S. Cl. ............................................ 370/236; 370/414
[58] Field of Search ........................... 370/230, 232, 370/233, 234, 235, 236, 412, 428, 468, 413, 414, 416, 418

[56] References Cited

U.S. PATENT DOCUMENTS

| | | |
|---|---|---|
| 5,220,563 | 6/1993 | Grenot et al. . |
| 5,274,680 | 12/1993 | Sorton et al. . |
| 5,381,410 | 1/1995 | Grenot . |
| 5,390,176 | 2/1995 | Schoute ........................................... 370/428 |
| 5,394,393 | 2/1995 | Brisson et al. . |
| 5,448,559 | 9/1995 | Hayter ........................................... 370/60.1 |
| 5,455,820 | 10/1995 | Yamada ........................................ 370/17 |
| 5,694,554 | 12/1997 | Kawabata .................................. 395/250 |
| 5,831,971 | 11/1998 | Bonomi .................................... 370/230 |

OTHER PUBLICATIONS

Ruixue Fan, et al., "Expandable Atom Switch Architecture (XATOM) For ATM Lans", Serving Humanity through Communications, Supercomm/ICC, New Orleans, LA, May 1–5, 1994, vol. 1 May 1, 1994, Institute of Electrical and Electronics Engineers, pp. 402–409.

Tim Moors, et al., "Implementing Traffic Shaping", Proceedings. 19th Conference on Local Computer Networks (Cat. No.94TH8004), Minneapolis, MN, USA, IEEE Comput. Soc. Press, USA, pp. 307–314.

*Primary Examiner*—Chau Nguyen
*Assistant Examiner*—Thinh Vu
*Attorney, Agent, or Firm*—Oblon, Spivak, McClelland, Maier & Neustadt, P.C.

[57] ABSTRACT

The disclosed device, placed within an ATM packet switch, is of the type comprising a multiplexer associated with a specified number of input and output buffers and a device to control the internal flows of ATM cells informing the input buffers of the state of congestion of the output buffers. This device further comprises means to convert the flow of sporadic point-to-multipoint cells, arriving at the input of the input buffers, into a regular flow of point-to-multipoint cells towards the multiplexer irrespective of the outgoing direction taken by the cells and independently for each input.

3 Claims, 2 Drawing Sheets

DEVICE TO REGULATE THE FLOW OF ATM CELLS WITHIN AN ATM PACKET SWITCH

BACKGROUND OF THE INVENTION

1. Field of the Invention

The present invention relates to a device for the regulation of the flow of ATM cells within an ATM (asynchronous transfer mode) type of packet switch that can be used to resolve the difficulty of making point-to-multipoint circuits for sporadic flows in ATM.

2. Discussion of Background

The ATM switching technique is internationally recognized as one that will become the basis of wideband telecommunications networks in the near future, in local area networks or LANS, metropolitan area networks or MANS and wide area networks or WANs as well as in networks for distribution to users (both professional and residential).

This technique consists of the packet switching over of the virtual circuits conveying protocol and user information elements. The ATM technique, which is based on a autonomously identified, fixed-size quantum of information known as a cell, enables the making of machines with a variety of roles and characteristics and with high performance values.

An ATM cell is formed by two main parts:

a header identifying the virtual circuit to which the cell belongs, protected by an error detector/corrector; the size of a header is fixed at 5 bytes by the ITU (International Telecommunications Union);

the payload, conveying the information proper to the user and to the matching of this information with the ATM; the size of the payload is fixed at 48 bytes by the ITU.

The types of traffic conveyed by ATM networks can be classified under four main categories:

a first category of traffic known as CBR traffic or constant bit rate traffic corresponds to the traffic associated with a constant bit rate source which therefore sends out cells (corresponding to sound, images encoded at constant bit rate etc.) at regular intervals;

a second category corresponds to what is known as VBR traffic or variable bit rate traffic and corresponds to traffic associated with a source with a variable bit rate, the variation of which depends on the instantaneous characteristics of the source (this traffic consists of images encoded at variable bit rate, etc.);

a third category corresponds to a type of traffic known as UBR traffic or unspecified bit rate traffic and corresponds to traffic associated with a source whose characteristics are not specified on an a priori basis. This type of traffic is typically associated with sources of the type pertaining to the transfer of computer files. This type of traffic is highly sporadic, without major constraints in terms of transfer time but requires a very low rate of information loss. It is generally desired to use the entire passband left available by the CBR/VBR flows; this is what is called the "best effort" or BE operation; and a fourth category corresponds to a traffic known as available bit rate or ABR traffic corresponding to the UBR traffic with, however, the sources being under the constraint of a control of flow proper to the ATM layer.

Typically, to the CBR and VBR type traffic there correspond statistical assumptions leading to relatively simple packet switching structures. These structures are characterized firstly by the absence of control over the flow and, secondly, by a small number of buffers or buffer memories, for a loss rate that is itself very small. To ensure that these statistical assumptions prevail, the traffic is "reserved" by a function for the allocation of the resources of the selector switch and is, if necessary, verified by a function access procedure with respect to the selector switch.

A type of architecture known as "output buffering" consists in placing buffer memories downline with respect to the multiplexing system (bus, ring, matrix, etc.). This architecture lends itself well to the making of CBR and VBR point-to-multipoint circuits since it is enough to simultaneously select several outputs to make a multiple copy of only one cell. The point-to-multipoint circuits correspond to circuits with one input port and several output ports, each output port delivering the same information. They are used to provide services requiring the general or selective broadcasting of information to several addressees, for example the broadcasting of image and sound, local network type of routing protocols, etc.

The UBR traffic differs from the CBR and VBR types of traffic in that the bit rate of the sources is not under constraint or under little constraint. It is then no longer possible to rely on stable short-term statistical behavior. The presence of a UBR/ABR flow requires "large" buffers owing to the sporadic nature of the traffic. These large buffers have a memory capacity typically equal to some thousands to some tens of thousands of cells. Depending on the architecture of the packet switching, it is necessary to add output buffers thereto and it may be desired to keep these output buffers "small" for reasons of speed, hence of cost of the memory. These small buffers have a memory capacity typically of some tens to some hundreds of cells. In this case, an internal flow control device enables the blocking of the output of the "large" buffers when the "small" buffers are full. Then, end-to-end transportation protocols are relied upon to limit the load offered to the limits of capacity of the "large" buffers.

The location of these "large" buffers differs according to the architecture. They are generally located at the input (input buffering) or at the center (central buffering) of the packet switch.

The ABR traffic introduces a flow control between the sources and the selector switches (or the destinations) enabling constraints to be placed on the sources within the limits that can be accepted by the installations of the network and thereby ensure overall loss-free operation.

The physical implementation of the point-to-multipoint circuits within ATM packet switches/selector switches is characterized by its level of complexity and hence its cost, and by its performance level as regards the bit rate offered, the repeated use of packet switching resources, multiple copies of the cells, etc. The present modes of implementation of such circuits propose physical solutions that are complex and therefore costly.

SUMMARY OF THE INVENTION

The invention is aimed at overcoming this drawback.

To this end, an object of the invention is a device to regulate the flow of ATM cells within an ATM packet switch of the type comprising a multiplexer associated with a specified number of input and output buffers and a device to control the internal flows of ATM cells informing the input buffers of the state of congestion of the output buffers, this device comprising means to convert the flow of sporadic point-to-multipoint cells, arriving at the input of the input buffers, into a regular flow of point-to-multipoint cells towards the multiplexer irrespective of the outgoing direction taken by the cells and independently for each input.

The advantage of the invention is that it provides a simple and economical physical solution for the implementation of point-to-multipoint circuits within ATM packet switches/selector switches.

BRIEF DISCLOSURE OF THE DRAWINGS

Other advantages and characteristics of the present invention shall appear more clearly from the following description, made with reference to the appended figures, of which:

DETAILED DESCRIPTION OF THE INVENTION

Figure 1:
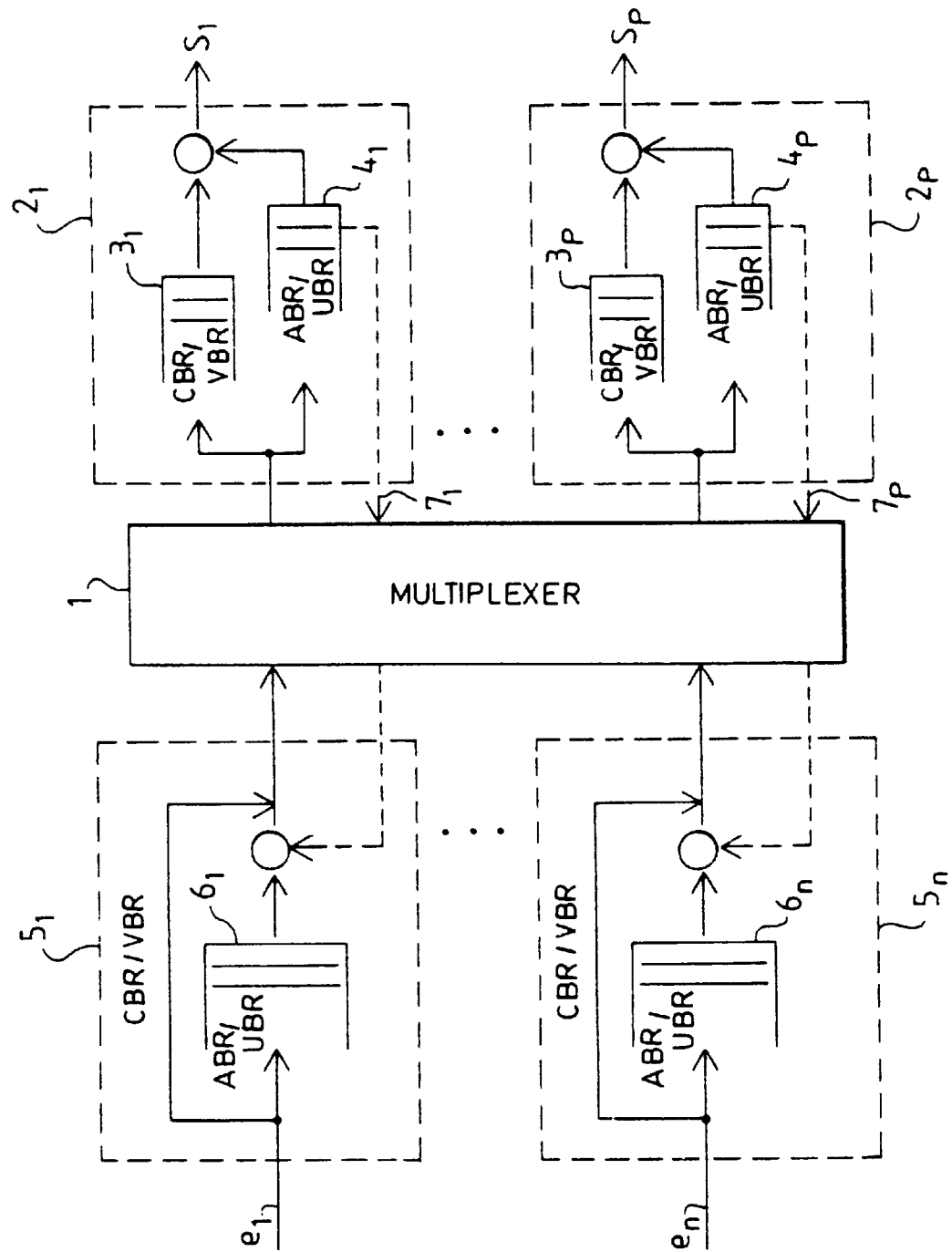
FIG. 1 shows a general architecture of an ATM packet switch.

The general architecture illustrated in FIG. 1 describes an implementation of the ATM broadcasting function for point-to-multipoint circuits adapted to the UBR and ABR traffic within an ATM packet switch.

The packet switch consists of:

a packet switching stage proper, consisting of a multiplexer 1 made out of a bus, a ring or the like and a specified number P of "small" buffers $2p$, with P=1 to p, having a high passband of the order of n+1 times the bit rate of the access links (n being equal to the number of inputs): these "small" buffers are located at the output of the multiplexer 1 and are each demarcated in the figure by a box of dashes; this part of the packet switch is therefore dedicated in principle to the flows of CBR and VBR type traffic, hereinafter called CBR/VBR flows; these buffers are organized into at least two levels of priority: the highest level is dedicated to the CBR/VBR flows and the lowest to the flows of ABR/UBR traffic, hereinafter called the ABR/UBR flows. A first queue $3_1$ is dedicated to the CBR/VBR flows and a second queue $4_1$ to the ABR/UBR flows;

a determined number N of "large" buffers $5_N$ with N=1 to n, located upline with respect to the multiplexer 1 and demarcated in the figure by a box of dashes in which the cells of the ABR and UBR flows are arranged in a queue $6_N$ before being oriented towards the appropriate destination or destinations; it can be seen that these buffers $5_N$ have a relatively small passband (about twice the bit rate of the link) and may therefore be constituted by "low cost" memories; and an internal flow control device $7p$ enabling the output of queues $4p$ dedicated to the ABR/UBR traffic to indicate their "almost full" state of congestion to the input buffers $5_N$. The states of congestion of the different output queues $4p$ are used for the UBR and ABR flows by the inputs of the multiplexer 1 to ascertain whether or not it is possible to send a cell to these outputs.

Only the packet switching mechanism is described in the present invention. The way in which the ATM layer is processed (translation, access procedure, OAM or operation and maintenance) as well as the mechanisms for the management of the input or output buffers are not described.

In an architecture of this kind, the different flows are processed typically in the following way:

With respect to the CBR and VBR point-to-point flows, the cells are sent out, upon arrival, to the queue of the selected output, whatever its state of being filled; in particular, if it is saturated, the cells will be lost.

With respect to the CBR and VBR point-to-multipoint flows, the cells are sent out, upon arrival, to the queue of the selected outputs, whatever their state of being filled; in particular, if some of them are saturated, the corresponding cells will be lost.

With respect to the ABR and UBR point-to-point flows, the cells are stored in an input buffer and then sent into the output buffers of the selected port when it is available; there is therefore no loss in the output queue.

With respect to the ABR and UBR point-to-multipoint flows, the method used by the CBR and VBR flows cannot be used. There is a risk of a loss of cells, given the very sporadic nature of these flows. This is also true for the ABR/UBR point-to-multipoint mechanism: there is no guarantee that it is possible to find an instant when all the selected directions are available simultaneously.

A first approach to the problem raised by the ABR and UBR point-to-multipoint flows would be to convert these flows into ABR/UBR point-to-multipoint flows, by copying the cells and retransmitting them one by one into the output queues when these are available. An approach of this kind has the drawback of multiplying the use of the packet switching resources by the number of destinations.

A device according to the invention overcoming this drawback has means to convert the ABR/UBR point-to-multipoint flows into CBR/VBR point-to-multipoint flows and to send them to the packet switching function as such.

To do this, the ABR/UBR point-to-multipoint flows are shunted towards a "shelling" device that releases the cells according to a simple mode whose statistics may be taken into account by the resources allocation function of the selector switch in the same way as for the CBR/VBR flows.

The simplest shelling mode consists in releasing the point-to-multipoint cells regularly, for example according to a time-lag type of event, irrespective of the outgoing directions that they take and independently for each input. The value applied in the time-lag device used for the shelling can be programmed by a control unit of the selector switch. This value is chosen as a function of data elements such as the a priori characteristics of the ABR/URB point-to-multipoint flows, the measured characteristics of the ABR/UBR point-to-multipoint flows, etc.

Figure 2:
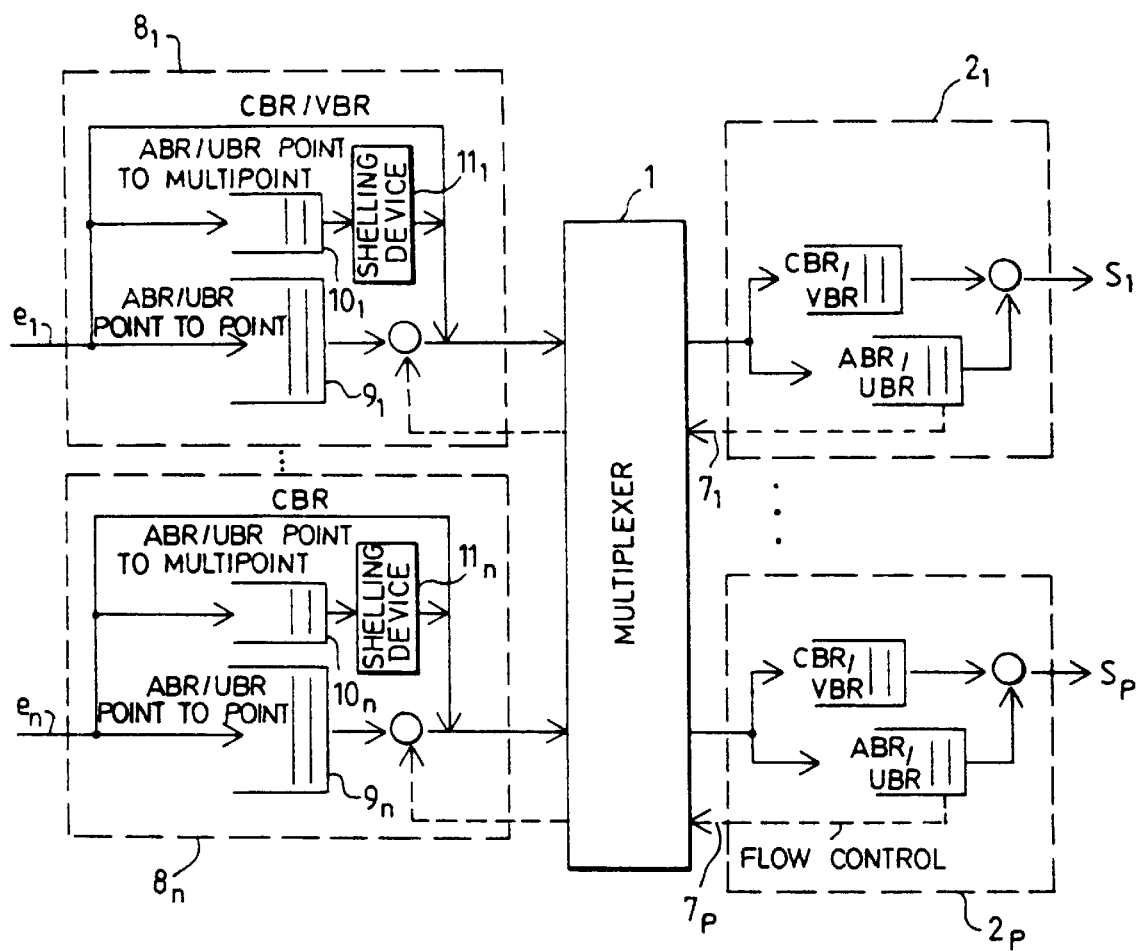
FIG. 2 shows an architecture of a device for the regulation of the flow of ATM cells according to the invention, within an ATM packet switch.

FIG. 2 shows the architecture of a packet switch according to the invention. In FIG. 2, the elements homologous to those of FIG. 1 are designated by the same references. Each input buffer $8_N$, N=1 to n, has a first queue dedicated to the ABR/UBR point-to-point traffic $9_N$ and a second queue dedicated to the ABR/UBR point-to-multipoint traffic $10_N$. The flow of cells sent by means of the second queue $10_N$ is shunted towards a shelling device $11_N$. The shelling device $11_N$ then releases the cells in a CBR/VBR flow towards the input port of the multiplexer 1. The resource allocation function of the selector switch takes account of the shelling value of each input buffer relating to an input point of the multiplexer 1 to keep a reserved CBR/VBR load up to date and to keep it within specified limits to ensure the efficient operation of the packet switch on the basis of the statistical assumptions related to these flows.

The load thus reserved CBR/VBR corresponds to the sum of the bit rates reserved for the real CBR/VBR traffic, namely the original CBR/VBR point-to-multipoint traffic to which there are added the shelling rates for the ABR/UBR point-to-multipoint traffic.

The CBR/VBR bit rate thus reserved is an upper bound: there is but little likelihood of all the ports $e_N$ having to simultaneously broadcast in every direction with a bit rate equal to that of the shelling device $11_N$. However, it can be seen that the reserved part, if any, that is "in excess" may be quite possibly used for the ABR/UBR point-to-multipoint flows (in this respect, the notion of the "best effort" is seen again).

It is possible nevertheless to limit this "excess" reservation or "over-reservation" by introducing modes of operation of greater complexity. The modes include an operation of sorting according to groups of directions to enable the simultaneous transmission of several cells in different directions without reserving the necessary CBR resource several times, an operation of correlation between the shelling devices $11_N$ to enable the pooling of the reserved CBR resource, etc.

It is also possible to modulate the shelling bit rate of the UBR/ABR multipoint flows as a function of the instantaneous load in terms of CBR/VBR flows. This would require a real-time measurement of this load but would have the advantage of being closer to the "complementary" function of the CBR/VBR flow.

The present invention is not limited to the specific description that has just been given.

What is claimed is:

1. A regulating device to regulate the flow of ATM cells within an ATM packet switch including a multiplexer associated with a specified number of input and output buffers and a control device to control the internal flows of ATM cells informing the input buffers of the state of congestion of the output buffers, said regulating device comprising means to convert the flow of sporadic point-to-multipoint cells, arriving at the input of the input buffers, into a regular flow of point-to-multipoint cells towards the multiplexer irrespective of the outgoing direction taken by the cells and independently for each input.

2. A device according to claim 1, wherein the means to convert comprise, in each input buffer, a shelling device enabling the release of the point-to-multipoint cells regularly towards the multiplexer.

3. A device according to claim 2, wherein the rate of the shelling is programmed by a control unit of the ATM packet switch.

* * * * *